US011874886B1

(12) United States Patent
Paul

(10) Patent No.: US 11,874,886 B1
(45) Date of Patent: *Jan. 16, 2024

(54) SYSTEMS AND METHODS FOR CREATING INTERACTIVE METADATA ELEMENTS IN SOCIAL MEDIA COMPOSITIONS

(71) Applicant: Meta Platforms, Inc., Menlo Park, CA (US)

(72) Inventor: Debashish Paul, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 202 days.

This patent is subject to a terminal disclaimer.

(21) Appl. No.: 17/157,100

(22) Filed: Jan. 25, 2021

Related U.S. Application Data

(63) Continuation of application No. 16/114,157, filed on Aug. 27, 2018, now Pat. No. 10,942,978.

(51) Int. Cl.
| | | |
|---|---|---|
| *G06F 16/44* | (2019.01) | |
| *G06F 16/90* | (2019.01) | |
| *G06F 16/95* | (2019.01) | |
| *G06F 16/9535* | (2019.01) | |
| *G06F 16/907* | (2019.01) | |
| *G06Q 50/00* | (2012.01) | |
| *G06F 16/9537* | (2019.01) | |

(52) U.S. Cl.
CPC ......... *G06F 16/9535* (2019.01); *G06F 16/44* (2019.01); *G06F 16/907* (2019.01); *G06F 16/9537* (2019.01); *G06Q 50/01* (2013.01)

(58) Field of Classification Search
None
See application file for complete search history.

(56) References Cited

U.S. PATENT DOCUMENTS

| | | |
|---|---|---|
| D341,848 S | 11/1993 | Bigelow et al. |
| 6,167,406 A | 12/2000 | Hoskins et al. |
| D437,342 S | 2/2001 | Kramer et al. |
| D626,140 S | 10/2010 | McLaughlin et al. |
| D663,314 S | 7/2012 | David et al. |
| D681,660 S | 5/2013 | Matas |
| 8,554,875 B1 | 10/2013 | Alfaro et al. |

(Continued)

OTHER PUBLICATIONS

Preinterview First Office Action received for U.S. Appl. No. 16/112,815 dated Nov. 29, 2019, 12 pages.

(Continued)

*Primary Examiner* — Son T Hoang
(74) *Attorney, Agent, or Firm* — Greenberg Traurig, LLP

(57) ABSTRACT

Systems and methods for creating digital interactive metadata elements in a social media composition may include (1) providing, to a user of a social media application, a composition interface for creating digital social media compositions, (2) collecting, via the composition interface, user-generated content and metadata information, (3) creating, based on the user-generated content and the metadata information, a social media composition that includes the user-generated content and an interactive metadata item, and (4) posting the social media composition to a consumption channel (e.g., a newsfeed channel and/or a stories channel) of a social-networking platform associated with the social media application. Various other methods, systems, and computer-readable media are also disclosed.

20 Claims, 14 Drawing Sheets

(56) References Cited

U.S. PATENT DOCUMENTS

| | | | |
|---|---|---|---|
| D701,228 S | 3/2014 | Lee | |
| D727,339 S | 4/2015 | Lee | |
| 9,118,723 B1 | 8/2015 | Su et al. | |
| D740,845 S | 10/2015 | Karunamuni et al. | |
| D741,897 S | 10/2015 | Wilkinson et al. | |
| D743,999 S | 11/2015 | Villamor et al. | |
| 9,251,124 B2 | 2/2016 | Steinfl et al. | |
| D753,703 S | 4/2016 | Villamor et al. | |
| D761,823 S | 7/2016 | Kang | |
| D764,511 S | 8/2016 | Han et al. | |
| D768,668 S | 10/2016 | Anzures et al. | |
| D768,688 S | 10/2016 | Chow-Quan | |
| D771,644 S | 11/2016 | Jewitt et al. | |
| D772,906 S | 11/2016 | Fu | |
| D776,692 S | 1/2017 | Armstrong | |
| 9,639,969 B1 | 5/2017 | Wilson et al. | |
| D789,389 S | 6/2017 | Kim et al. | |
| D789,956 S | 6/2017 | Ortega et al. | |
| D801,361 S | 10/2017 | Gu et al. | |
| D803,257 S | 11/2017 | Graham et al. | |
| 9,911,300 B2 | 3/2018 | Herbst et al. | |
| D815,130 S | 4/2018 | Phillips et al. | |
| D822,689 S | 7/2018 | Amidei et al. | |
| D823,871 S | 7/2018 | Verdu Orts et al. | |
| D831,059 S | 10/2018 | Bao | |
| 10,126,927 B1 | 11/2018 | Fieldman | |
| D835,144 S | 12/2018 | Baker | |
| D837,240 S | 1/2019 | Van Tricht | |
| D838,732 S | 1/2019 | Furdei et al. | |
| D838,741 S | 1/2019 | Tijerina et al. | |
| D841,024 S | 2/2019 | Clediere et al. | |
| D842,871 S | 3/2019 | Clediere et al. | |
| 10,263,802 B2 | 4/2019 | Burns et al. | |
| D852,213 S | 6/2019 | Clediere et al. | |
| D852,215 S | 6/2019 | Westerhold et al. | |
| D852,832 S | 7/2019 | Westerhold et al. | |
| D858,546 S | 9/2019 | Haile et al. | |
| D859,442 S | 9/2019 | Zhang et al. | |
| D861,715 S | 10/2019 | Haile et al. | |
| D870,141 S | 12/2019 | Bowden et al. | |
| D885,412 S | 5/2020 | Alvarez et al. | |
| 10,684,738 B1* | 6/2020 | Sicora | G06F 16/435 |
| D890,198 S | 7/2020 | Paul | |
| D894,921 S | 9/2020 | Paul | |
| D895,657 S | 9/2020 | Howland et al. | |
| 10,942,978 B1 | 3/2021 | Paul | |
| 11,017,164 B1 | 5/2021 | Paul | |
| 11,025,582 B1 | 6/2021 | Paul | |
| 2003/0179223 A1 | 9/2003 | Ying et al. | |
| 2005/0114374 A1 | 5/2005 | Juszkiewicz et al. | |
| 2009/0125588 A1 | 5/2009 | Black et al. | |
| 2009/0148070 A1 | 6/2009 | Hwang et al. | |
| 2010/0153886 A1 | 6/2010 | Hautala | |
| 2010/0257490 A1 | 10/2010 | Lyon et al. | |
| 2011/0050975 A1 | 3/2011 | Chung | |
| 2011/0087994 A1 | 4/2011 | Swink et al. | |
| 2011/0264582 A1 | 10/2011 | Kim et al. | |
| 2012/0209902 A1* | 8/2012 | Outerbridge | G06F 16/9535 |
| 2012/0308209 A1 | 12/2012 | Zaletel | |
| 2012/0323930 A1 | 12/2012 | Kennberg et al. | |
| 2013/0111395 A1 | 5/2013 | Ying et al. | |
| 2013/0124634 A1 | 5/2013 | Weinstein et al. | |
| 2013/0332831 A1 | 12/2013 | Birnkrant et al. | |
| 2013/0332850 A1 | 12/2013 | Bovet et al. | |
| 2014/0040775 A1 | 2/2014 | Stoop et al. | |
| 2014/0089833 A1 | 3/2014 | Hwang et al. | |
| 2014/0129627 A1 | 5/2014 | Baldwin et al. | |
| 2014/0136346 A1* | 5/2014 | Teso | G06F 16/35 |
| 2014/0181010 A1 | 6/2014 | Imbruce et al. | |
| 2014/0189608 A1 | 7/2014 | Shuttleworth et al. | |
| 2014/0195675 A1 | 7/2014 | Silver | |
| 2014/0237055 A1 | 8/2014 | Burrell et al. | |
| 2014/0244621 A1 | 8/2014 | Lindsay | |
| 2014/0244622 A1 | 8/2014 | Lindsay et al. | |
| 2014/0280629 A1 | 9/2014 | Rubinstein et al. | |
| 2014/0282077 A1 | 9/2014 | Wilson et al. | |
| 2014/0298253 A1 | 10/2014 | Jin et al. | |
| 2015/0012525 A1* | 1/2015 | Lindsay | G06F 16/5866 707/722 |
| 2015/0020170 A1 | 1/2015 | Talley | |
| 2015/0032675 A1* | 1/2015 | Huehn | G06F 16/9537 707/740 |
| 2015/0106731 A1 | 4/2015 | Matas et al. | |
| 2015/0134603 A1 | 5/2015 | Melamed et al. | |
| 2015/0143256 A1 | 5/2015 | Panchawagh-Jain | |
| 2015/0149967 A1 | 5/2015 | Bernstein et al. | |
| 2015/0195314 A1* | 7/2015 | Reed | G06F 16/5866 |
| 2015/0199770 A1 | 7/2015 | Wallenstein | |
| 2015/0206446 A1 | 7/2015 | Gupta et al. | |
| 2015/0248193 A1 | 9/2015 | Fujioka | |
| 2015/0286371 A1 | 10/2015 | Degani | |
| 2015/0312184 A1 | 10/2015 | Langholz et al. | |
| 2015/0350259 A1* | 12/2015 | Garg | G06F 16/958 |
| 2016/0006679 A1 | 1/2016 | Williams et al. | |
| 2016/0011758 A1 | 1/2016 | Dornbush et al. | |
| 2016/0092064 A1 | 3/2016 | Wu | |
| 2016/0119751 A1 | 4/2016 | Park et al. | |
| 2016/0132200 A1 | 5/2016 | Walkin et al. | |
| 2016/0149843 A1 | 5/2016 | Spicer et al. | |
| 2016/0219057 A1 | 7/2016 | Das et al. | |
| 2016/0301813 A1 | 10/2016 | Swire et al. | |
| 2016/0328096 A1 | 11/2016 | Tran et al. | |
| 2017/0024832 A1* | 1/2017 | Dareshani | G06F 16/44 |
| 2017/0127128 A1 | 5/2017 | Seger | |
| 2017/0149714 A1 | 5/2017 | Valdivia et al. | |
| 2017/0250938 A1 | 8/2017 | Dahl et al. | |
| 2017/0337747 A1 | 11/2017 | Hull | |
| 2018/0121065 A1 | 5/2018 | Seo et al. | |
| 2018/0136797 A1* | 5/2018 | Dickens | G06F 16/9535 |
| 2018/0183738 A1 | 6/2018 | Parnell | |
| 2018/0191797 A1 | 7/2018 | Javier et al. | |
| 2018/0191962 A1 | 7/2018 | Javier et al. | |
| 2019/0200051 A1 | 6/2019 | Paul et al. | |

OTHER PUBLICATIONS

Non-Final Office Action received for U.S. Appl. No. 16/122,838 dated Oct. 16, 2019, 15 pages.

Final Office Action received for U.S. Appl. No. 16/122,838 dated Dec. 16, 2019, 17 pages.

Paul, Debashish, "Systems and Methods for Creating Multiple Renditions of a Social Media Composition from Inputs to a Single Digital Composer", U.S. Appl. No. 16/122,826 dated Sep. 5, 2018, 67 pages.

"Welcome to Kanazawa", URL: https://web.archive.org/web/20150407020335/http://www.ishikawakintetsu.co.jp/howto_en.html, Apr. 7, 2015, 2 pages.

Non-Final Office Action received for U.S. Appl. No. 29/660,463 dated Oct. 22, 2019, 11 pages.

Ong, Thuy, ""Facebook rolls out GIF-supported polls feature to web and mobile apps"", URL: https://www.theverge.com/2017/11/3/16602592/facebook-polls-feature-web-ios-android-apps, Nov. 3, 2017, pp. 1-2.

Notice of Allowance received for U.S. Appl. No. 29/660,463 dated Feb. 6, 2020, 37 pages.

Nesterov, Anatoly, "7 Types of Animations for Your Mobile App", URL: https://web.archive.org/web/20160315010906/https://yalantis.com/blog/-seven-types-of-animations-for-mobile-apps, Mar. 15, 2016, pp. 1-15.

Non-Final Office Action received for U.S. Appl. No. 29/660,466 dated Oct. 23, 2019, 9 pages.

Ex Parte Quayle Action received for U.S. Appl. No. 29/660,466 dated Feb. 10, 2020, 19 pages.

Arpost, "The AR City App from Blippar promises better-than-GPS navigation thanks to augmented reality", URL: arpost.co/2017/11/17 far-city-augmented-reality-navigation, Nov. 17, 2017, 2 pages.

Paul, Debashish, "Systems and Methods for Creating Interactive Metadata Elements in Social Media Compositions", U.S. Appl. No. 16/114,157 dated Aug. 27, 2018, 58 pages.

(56) References Cited

OTHER PUBLICATIONS

Final Office Action received for U.S. Appl. No. 16/112,815 dated Feb. 18, 2020, 26 pages.
Non-Final Office Action received for U.S. Appl. No. 16/112,815 dated Apr. 29, 2020, 43 pages.
Non-Final Office Action received for U.S. Appl. No. 16/122,838 dated Mar. 6, 2020, 17 pages.
Final Office Action received for U.S. Appl. No. 16/122,838 dated May 26, 2020, 30 pages.
Preinterview First Office Action received for U.S. Appl. No. 16/122,826 dated Mar. 3, 2020, 30 pages.
First Action Interview received for U.S. Appl. No. 16/122,826 dated Mar. 25, 2020, 15 pages.
Preinterview First Office Action received for U.S. Appl. No. 16/114,157 dated Mar. 30, 2020, 32 pages.
Notice of Allowance received for U.S. Appl. No. 29/660,466 dated Apr. 29, 2020, 20 pages.
Paul, Debashish, "Display Screen with Graphical User interface", U.S. Appl. No. 29/732,572, filed Apr. 24, 2020, 14 pages.
Final Office Action received for U.S. Appl. No. 16/122,826 dated Jul. 9, 2020, 30 pages.
Final Office Action received for U.S. Appl. No. 16/114,157 dated Sep. 1, 2020, 92 pages.
Final Office Action received for U.S. Appl. No. 16/112,815 dated Oct. 1, 2020, 44 pages.
Non-Final Office Action received for U.S. Appl. No. 16/122,826 dated Oct. 28, 2020, 47 pages.
Notice of Allowance received for U.S. Appl. No. 16/114,157 dated Nov. 23, 2020, 96 pages.
Notice of Allowance received for U.S. Appl. No. 16/112,815 dated Feb. 3, 2021, 54 pages.
Notice of Allowance received for U.S. Appl. No. 16/122,826 dated Feb. 3, 2021, 31 pages.
U.S. Appl. No. 16/114,157, filed Aug. 27, 2018, U.S. Appl. No. 29/660,466, filed Aug. 21, 2018.
U.S. Appl. No. 16/112,815, filed Aug. 27, 2018.
U.S. Appl. No. 16/122,838, filed Sep. 5, 2018.
U.S. Appl. No. 16/122,826, filed Sep. 5, 2018. U.S. Appl. No. 29/660,463, filed Aug. 21, 2018.
U.S. Appl. No. 29/660,463, filed Aug. 21, 2018.
Notice of Allowance received for U.S. Appl. No. 29/732,572 dated Jun. 11, 2021, 46 pages.
Melnyk, Volodymyr, "UX Wireframes for Online Grocery Shopping Mobile App", URL: https://www.behance.net/gallery/32614399/UX-Wireframes-for-Online-Grocery-Shopping-Mobile-App, Jan. 5, 2016, 4 pages.

* cited by examiner

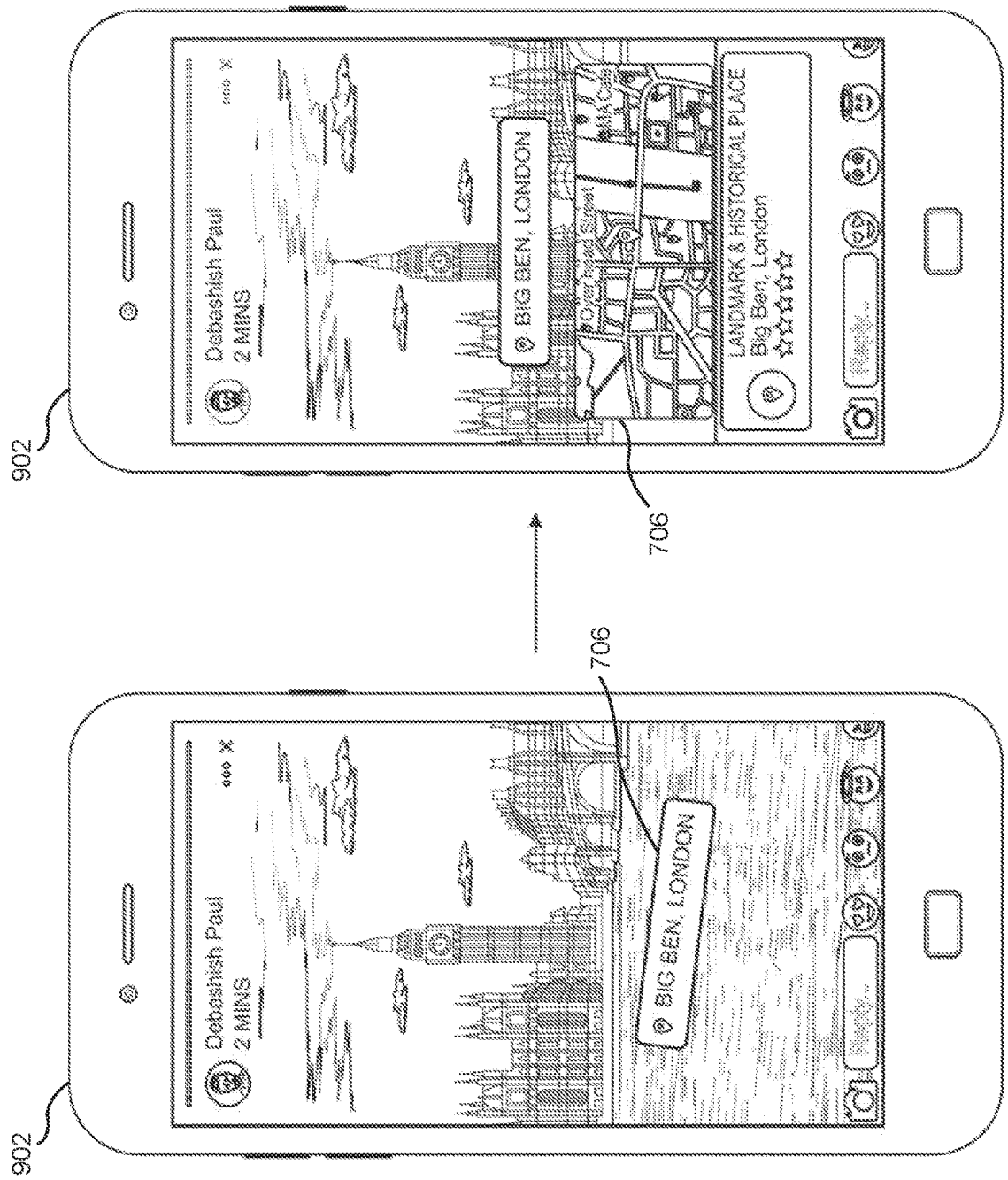

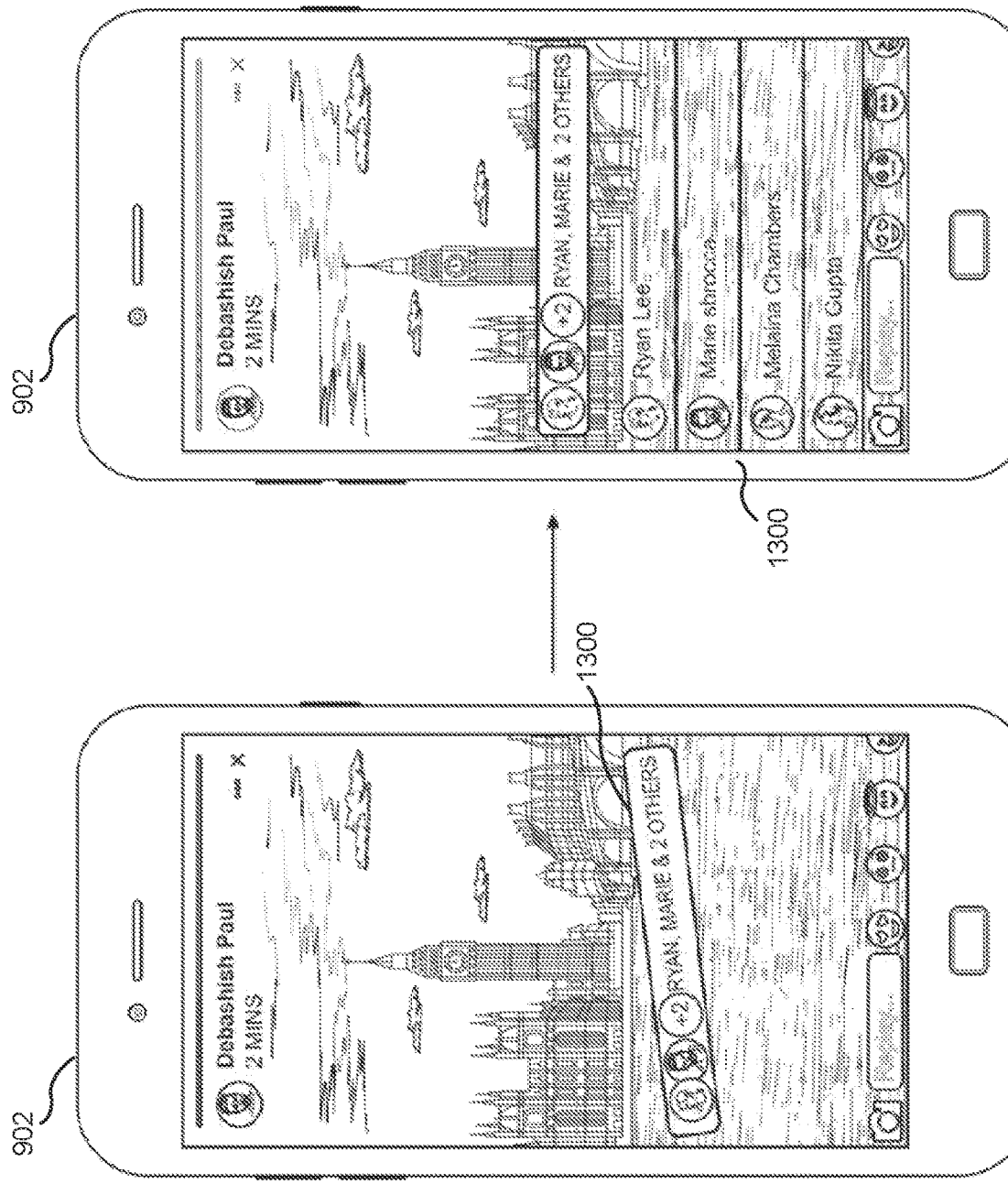

SYSTEMS AND METHODS FOR CREATING INTERACTIVE METADATA ELEMENTS IN SOCIAL MEDIA COMPOSITIONS

CROSS REFERENCE TO RELATED APPLICATION

This application is a continuation of U.S. patent application Ser. No. 16/114,157, entitled "SYSTEMS AND METHODS FOR CREATIONG INTERACTIVE METADATA ELEMENTS IN SOCIAL MEDIA COMPOSITIONS," filed 27 Aug. 2018. The disclosure of which are incorporated, in its entirety, by this reference.

BACKGROUND

Social media platforms allow users to share and consume social media compositions. These compositions may include a variety of content: media items (e.g., digital photographs and/or videos), links to online articles, text commentary, etc. Some compositions may include metadata information that provides context for a composition. For example, metadata information may indicate a location where a photograph was taken, convey a feeling of a composer, and/or tag friends. The disclosed systems and methods identify a need for improved systems and methods for creating metadata items that are interactive to users consuming social media compositions, improving users' ability to digitally connect.

SUMMARY

As will be described in greater detail below, the instant disclosure describes various systems and methods for creating interactive metadata elements in social media compositions. In one example, a computer-implemented method may include (1) providing, to a user of a social media application, a composition interface for creating digital social media compositions, (2) collecting, via the composition interface, user-generated content and metadata information, (3) creating, based on the user-generated content and the metadata information, a social media composition that includes the user-generated content and an interactive metadata item, and (4) posting the social media composition to a consumption channel (e.g., a newsfeed channel and/or a stories channel) of a social-networking platform associated with the social media application. In some examples, the interactive metadata item may represent a user-selectable element. In these examples, the interactive metadata item may change appearance from an initial appearance to a modified appearance in response to receiving user input selecting the user-selectable element.

In one embodiment, the method may further include (1) receiving user input from an additional user that selects the user-selectable element of the interactive metadata item and (2) in response to receiving the user input from the additional user, changing the appearance of the interactive metadata item from the initial appearance to the modified appearance.

In some examples, the metadata information may represent location information and the interactive metadata item may represent a digital location sticker. In these examples, changing the appearance of the interactive metadata item from the initial appearance to the modified appearance may include changing the appearance from a truncated version of the digital location sticker to an expanded version of the digital location sticker. In one such example, the truncated version of the digital location sticker may include a text-based identifier of a location and the expanded version of the digital location sticker may include the text-based identifier and may additionally include a map of the location, a categorization of the location, historical information relating to the location, and/or user ratings pertaining to the location.

In some examples, the metadata information may represent feelings information and the interactive metadata item may represent a digital feelings sticker. In these examples, changing the appearance of the interactive metadata item from the initial appearance to the modified appearance may include changing the appearance from a static version of the digital feelings sticker to an animated version of the digital feelings sticker In some examples, the metadata information may represent friends information and the interactive metadata item may represent a digital friends sticker. In these examples, changing the appearance of the interactive metadata item from the initial appearance to the modified appearance may include changing the appearance from a truncated version of the digital friends sticker to an expanded version of the digital friends sticker. In one such embodiment, the truncated version of the digital friends sticker may include a truncated list of friends tagged by the user for the social media composition and the expanded version may include a full list of the friends tagged by the user. In one embodiment, the expanded version may also include, for each friend within the full list of friends, a user-selectable element to add the friend to a friends network.

In some examples, the metadata information may represent user-generated text and the interactive metadata item may represent a digital text sticker. In these examples, changing the appearance of the interactive metadata item from the initial appearance to the modified appearance may include changing the appearance from a redacted version of the digital text sticker to a full version of the digital text sticker.

In one embodiment, a system for implementing the above-described method may include (1) a display module, stored in memory, that provides, to a user of a social media application, a composition interface for creating digital social media compositions, (2) a composition module, stored in memory, that (i) collects, via the composition interface, user-generated content and metadata information and (ii) creates, based on the user-generated content and the metadata information, a social media composition that includes the user-generated content and an interactive metadata item, (3) a consumption module that posts the social media composition to an additional user via a consumption channel of a social-networking platform associated with the social media application, and (4) at least one physical processor configured to execute the display module, the composition module, and the consumption module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) provide, to a user of a social media application, a composition interface for creating digital social media compositions, (2) collect, via the composition interface, user-generated content and metadata information, (3) create, based on the user-generated content and the metadata information, a social media composition that includes the user-generated content and an interactive metadata item, (4) post the social media composition to a consumption channel of a social-networking platform associated with the social media application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 11A-11B are an illustration of the functionality of an exemplary digital location sticker.

FIGS. 13A-13B are an illustration of the functionality of an exemplary digital friends sticker.

Figure 1:
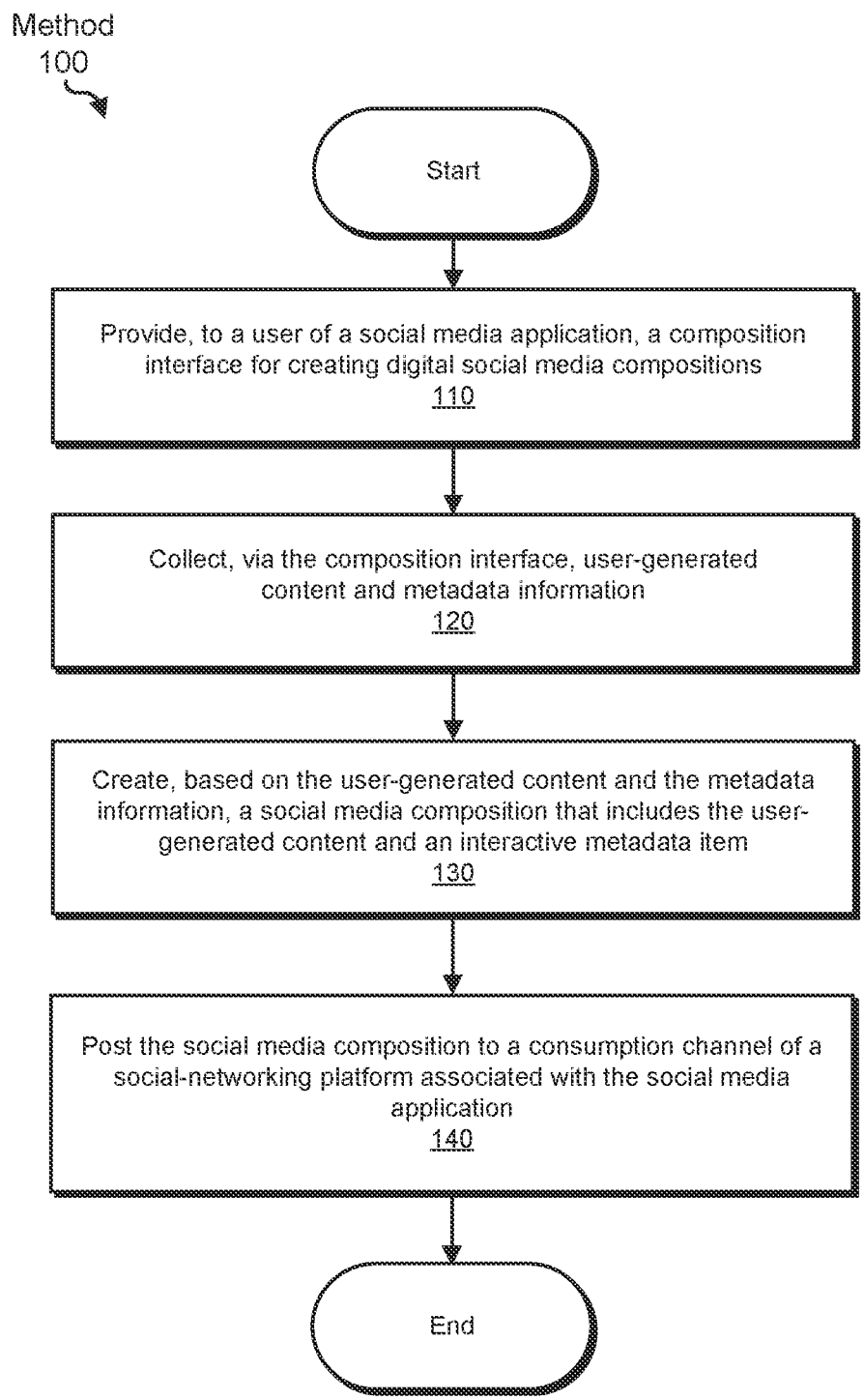
FIG. 1 is a flow diagram of an exemplary method for creating digital interactive metadata elements in a social media composition.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to metadata items, included in media compositions, that are interactive on the consumption side (i.e., by users viewing the compositions via a consumption channel such as a newsfeed). For example, a location sticker may be expandable such that a user may toggle between a redacted version of the location sticker that indicates a name of the location and an expanded version that includes additional data, such as a map and/or historical information about the location.

As another example, a friends sticker may include a redacted version (e.g., that indicates a number of friends who are tagged in a post and/or names a limited number of the friends) and an expanded version with additional information (e.g., a complete list of the friends and/or an ability to add a friend from the list of friends by selecting an add-friend element of the expanded sticker). As another example, a feelings sticker may include a static version and a dynamic version. For example, a static image of a smiley-face with heart eyes may, when clicked on by a user, change positions on the user's screen and fill the user's screen with heart graphics. As another example, a text sticker may be redacted and/or expanded to include less or more of the text.

By allowing users to create social media compositions with interactive elements, the disclosed systems and methods may expand a user's ability to meaningfully connect with other users. Additionally, the use of interactive stickers may provide an efficient use of limited screen space (e.g., by providing expandable content). Thus, the present disclosure provides a technical solution to a technical problem of limited screen space.

The following will provide, with reference to FIG. 1, detailed descriptions of computer-implemented methods for creating interactive metadata elements in social media compositions. Detailed descriptions of corresponding example systems will also be provided in connection with FIG. 2. In addition, detailed descriptions of exemplary creation flows will be provided in connection with FIG. 3-10 and detailed descriptions of exemplary interactive metadata elements will be provided in connection with FIGS. 11-14.

FIG. 1 is a flow diagram of an exemplary computer-implemented method 100 for creating interactive metadata elements in social media compositions. The steps shown in FIG. 1 may be performed by any suitable computer-executable code and/or computing system, such as the systems described herein. In one embodiment, the steps shown in FIG. 1 may be performed by modules operating within a mobile device. For example, the steps shown in FIG. 1 may be performed by modules operating in a user device 202 as shown in exemplary system 200 in FIG. 2.

Figure 2:
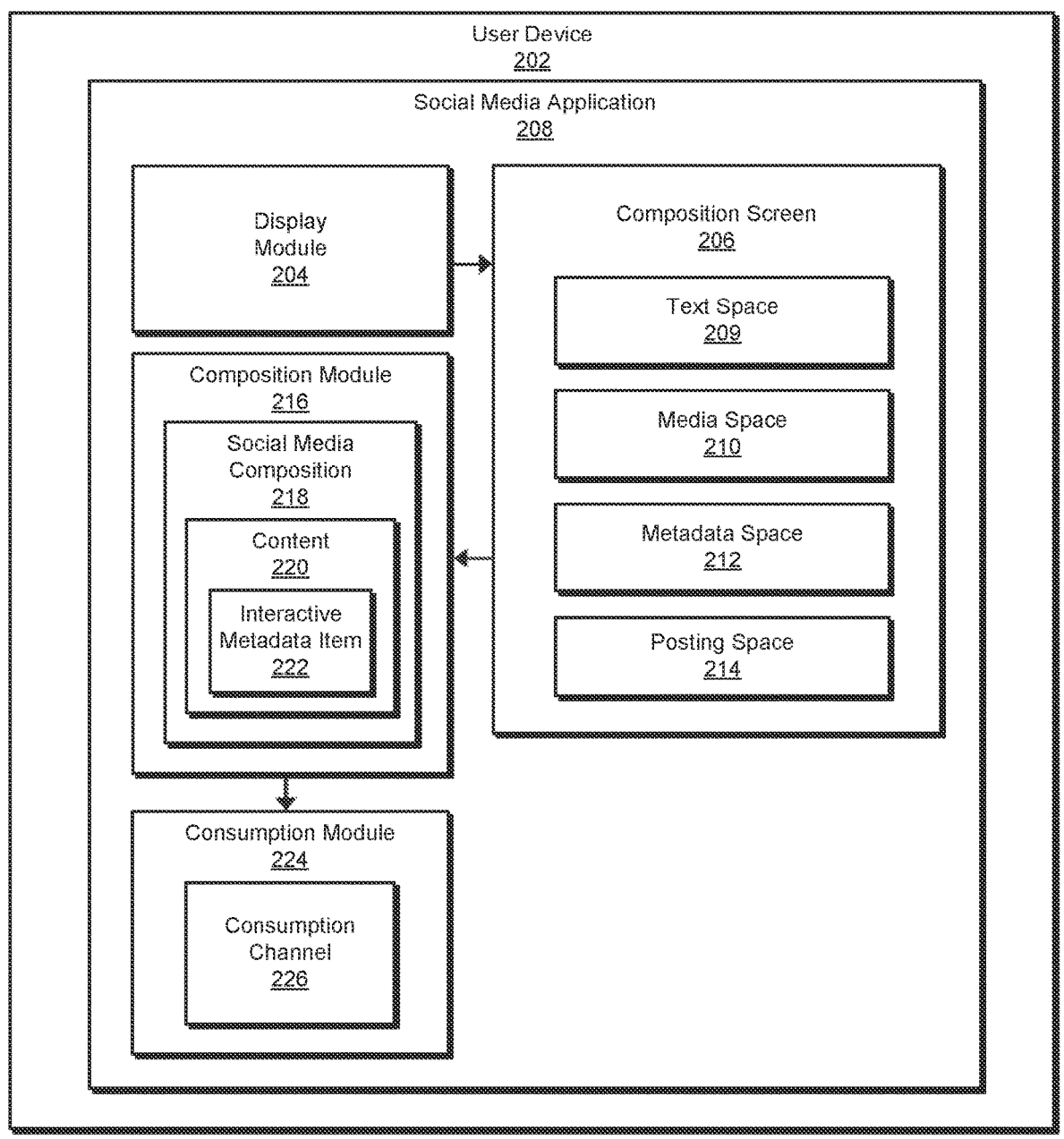
FIG. 2 is a block diagram of an exemplary system for creating digital interactive metadata elements in a social media composition.

As illustrated in FIG. 1, at step 110, one or more of the systems described herein may provide, to a user of a social media application, a composition interface for creating digital social media compositions. For example, as illustrated in FIG. 2, a display module 204 may provide, on user device 202, a composition screen 206.

User device 202 generally represents any type or form of computing device capable of reading computer-executable instructions. For example, user device 202 may represent a user device such as a smart phone and/or a tablet. Additional examples of user device 202 may include, without limitation, laptops, desktops with mobile elements, wearable devices, personal digital assistants (PDAs), etc. In some examples, a user of user device 202 may have a user account with a social-networking platform and may have a social media application 208, managed by the social-networking platform and associated with the user's account, installed on user device 202.

Social media application 208 generally represents any type or form of computer program that may be installed and executed on user device 202 to cause user device 202 to perform useful tasks. In some examples, social media application 208 may be used both to create social media compositions (e.g., using a composition process presented via one or more graphical user interfaces of social media application 208) and to view user compositions created by other users. In some examples, social media application 208 may allow users to create compositions that may be posted to multiple different consumption channels. For example, social media application 208 may allow users to create a newsfeed composition for a newsfeed channel and a story composition for a stories channel.

As used herein, the term "newsfeed consumption channel" generally refers to any type or form of social media consumption channel that presents a scrollable collection of newsfeed compositions. In some examples, a newsfeed may scroll (e.g., upward or downward) to reveal different compositions within the newsfeed, in response to receiving user scrolling input. In one example, the scrollable collection may include a collection of newsfeed compositions created by contacts of a particular user (e.g., friends of the particular user). The term "newsfeed composition" as used herein generally refers to any type or form of composition that may be displayed in a newsfeed consumption channel. Newsfeed compositions may include, without limitation, text-based compositions, media-based compositions (which may include either a single media item or a collage of multiple media items), and/or a link to an online article.

As used herein, the term "stories consumption channel" generally refers to any type or form of social media consumption channel that presents a continuous series of story compositions to a composition-consumer, one by one. In one example, the stories consumption channel may transition from presenting one story composition to the next automatically, without requiring any user input to do so. In some examples, a story composition may only be viewable for a predetermined amount of time. For example, a story composition may be set to disappear after twenty-four hours. The term "story composition" as used herein generally refers to any type or form of social media composition intended for a stories consumption channel. In some examples, a story composition may include a digital video. In other examples, a story composition may include a collection of one or more digital media items. In these examples, the story composition may include a text-based cover card that is displayed for a predetermined amount of time followed by one or more digital media items (e.g., a series of digital photographs), each of which may be subsequently displayed for a subsequent predetermined amount of time.

Composition screen 206 generally represents any type or form of computer-mediated user interface presented via a display element of a computing device that allows a user to create a social media composition. In some examples, composition screen 206 may allow a user to create interactive digital metadata items that other users, who subsequently consume a composition with the interactive digital metadata items, may interact with. In one embodiment, the composition screen may represent a composition landing screen that is the initial screen presented to the user after a composition creation process is initiated. In an additional or alternative embodiment, the composition screen may represent one of multiple composition screens presented as part of a creation flow.

Display module 204 may provide composition screen 206 (e.g., by displaying composition screen 206 on a display element of user device 202) in response to a variety of triggers. In some examples, display module 204 may automatically provide composition screen 206 as an initial welcome screen presented in response to receiving user input opening social media application 208.

Figure 3:
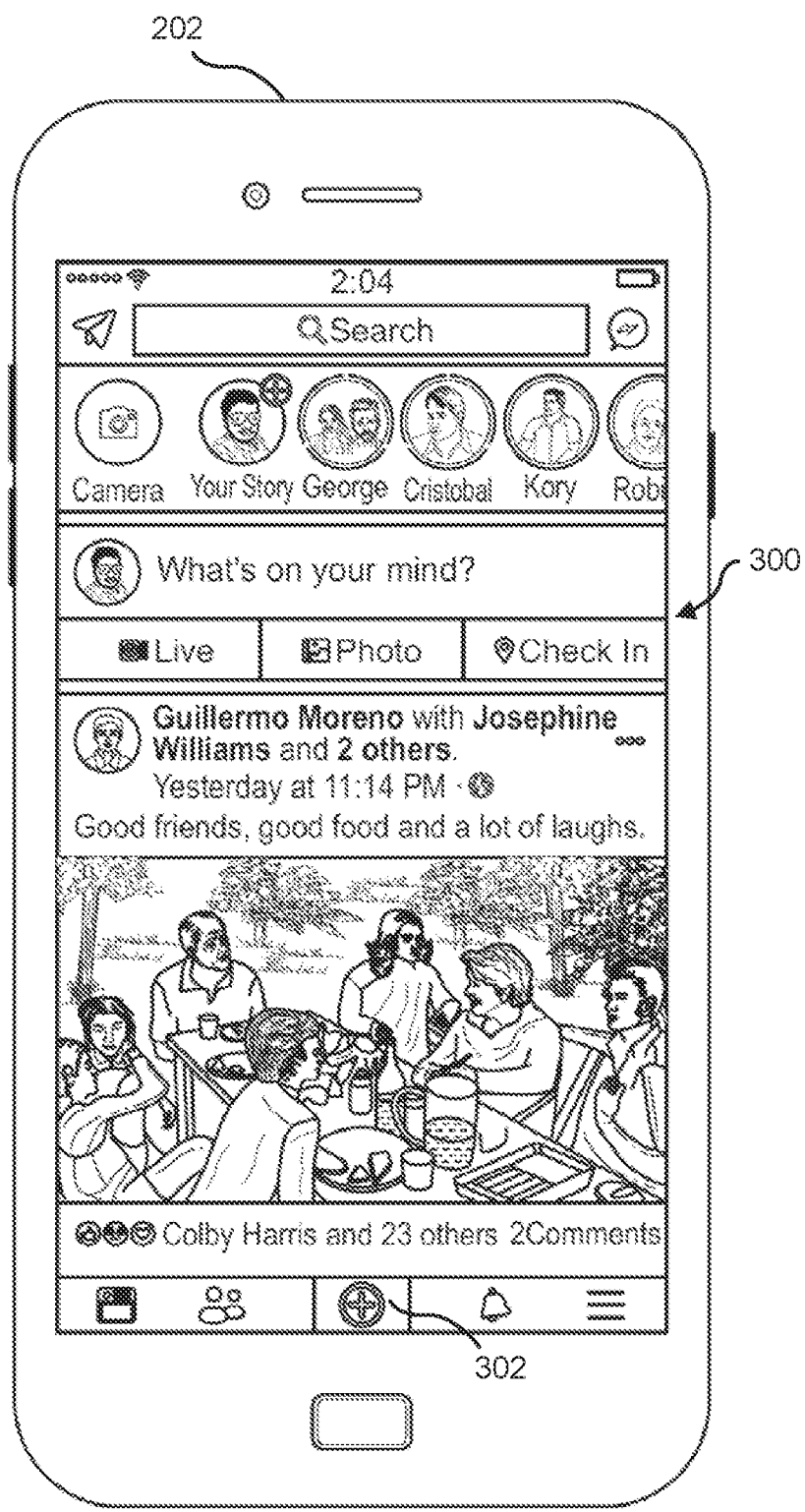
FIG. 3 is an illustrations of an exemplary predecessor screen that navigates to a composition screen.

In other examples, a non-composition screen, such as a newsfeed screen, may be configured as the initial welcome screen, or a user may wish to transition from a non-composition screen, such as a newsfeed screen or a messenger screen, to a composition screen. In these examples, a predecessor screen may include a text box (e.g., with a prompt such as "What's on your mind?") and composition screen 206 may be retrieved when the text box is selected. Additionally or alternatively, the predecessor screen may include a composition icon which, when selected, triggers the retrieval of composition screen 206. For example, FIG. 3 is an illustration of an exemplary predecessor screen 300 (a newsfeed screen in this example) with a composition icon 302 that depicts a glyph of a plus sign, conveying that the user may add a composition to his or her profile by selecting the composition icon.

Returning to FIG. 2, composition screen 206 may include multiple input spaces (each of which may receive user input). For example, composition screen 206 may include a text space 209, which enables the user to input text, a media space 210, which displays one or more media items that may be selected by a user, a metadata space 212, which displays one or more metadata items may be selected by the user, and/or a posting space 214, which the user may select when he or she is ready to post a social media composition created using composition screen 206.

Figure 4:
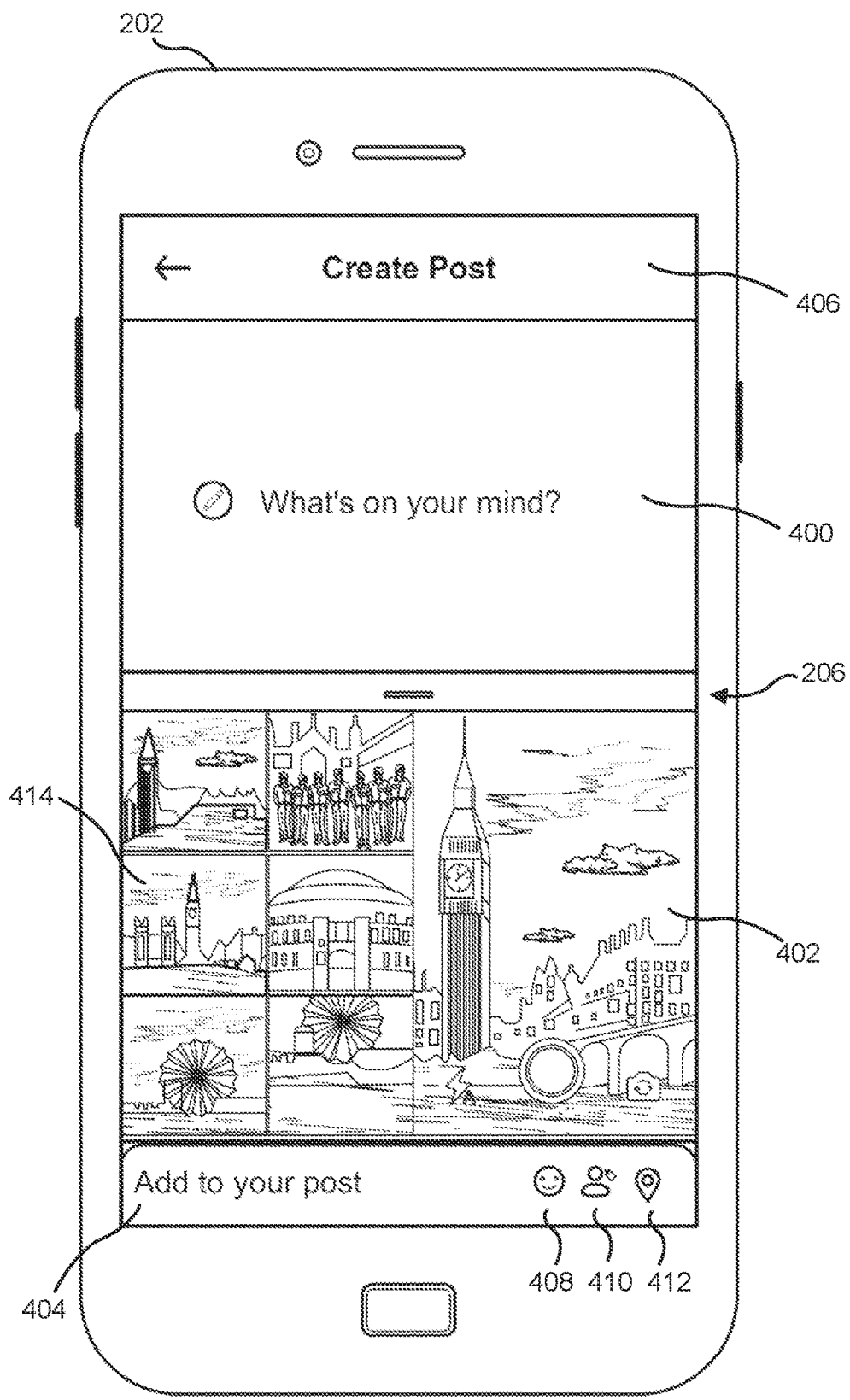
FIG. 4 is an illustration of an exemplary composition screen.
Figure 5:
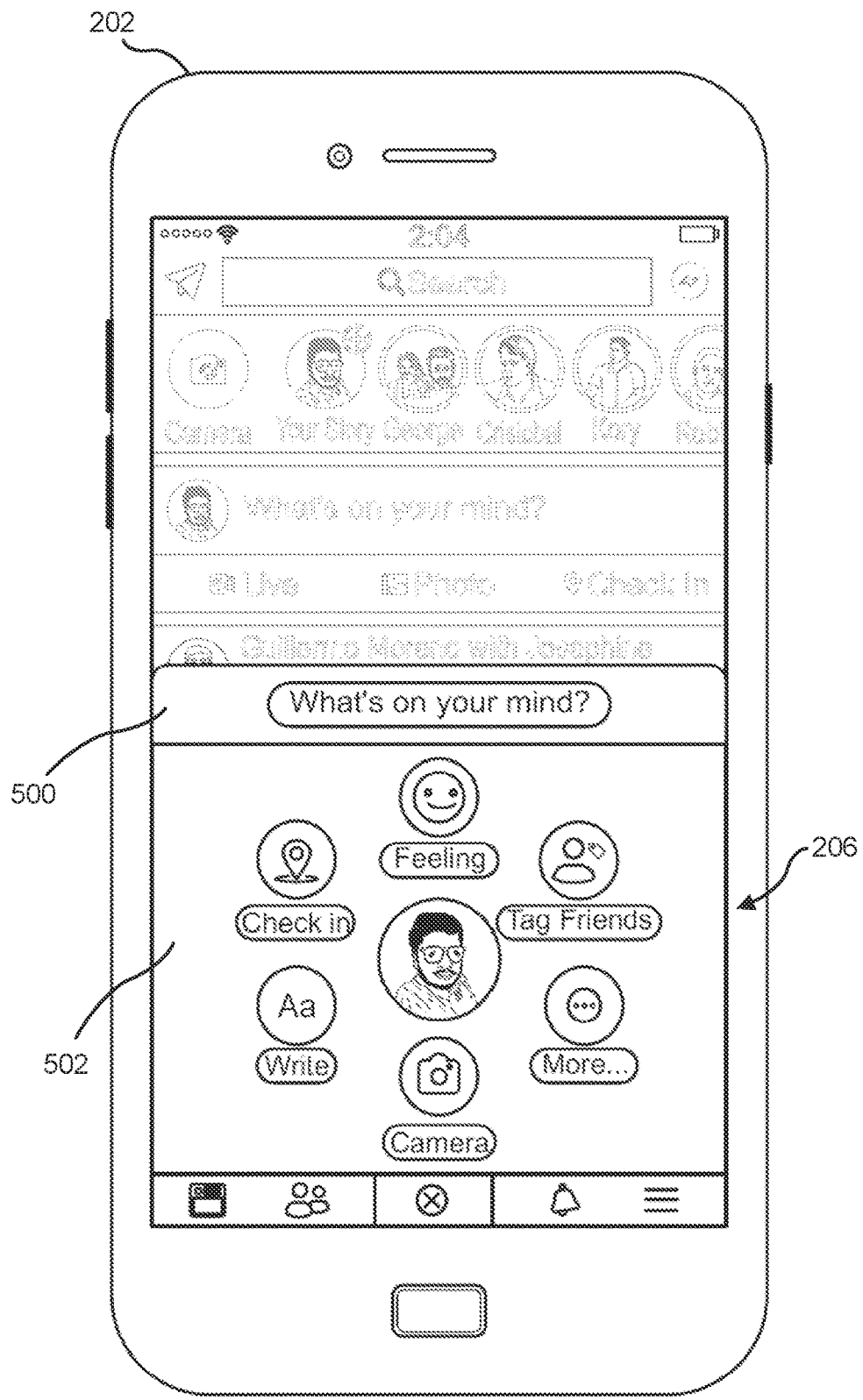
FIG. 5 is an illustration of an exemplary composition screen arranged in a circular configuration.
Figure 6:
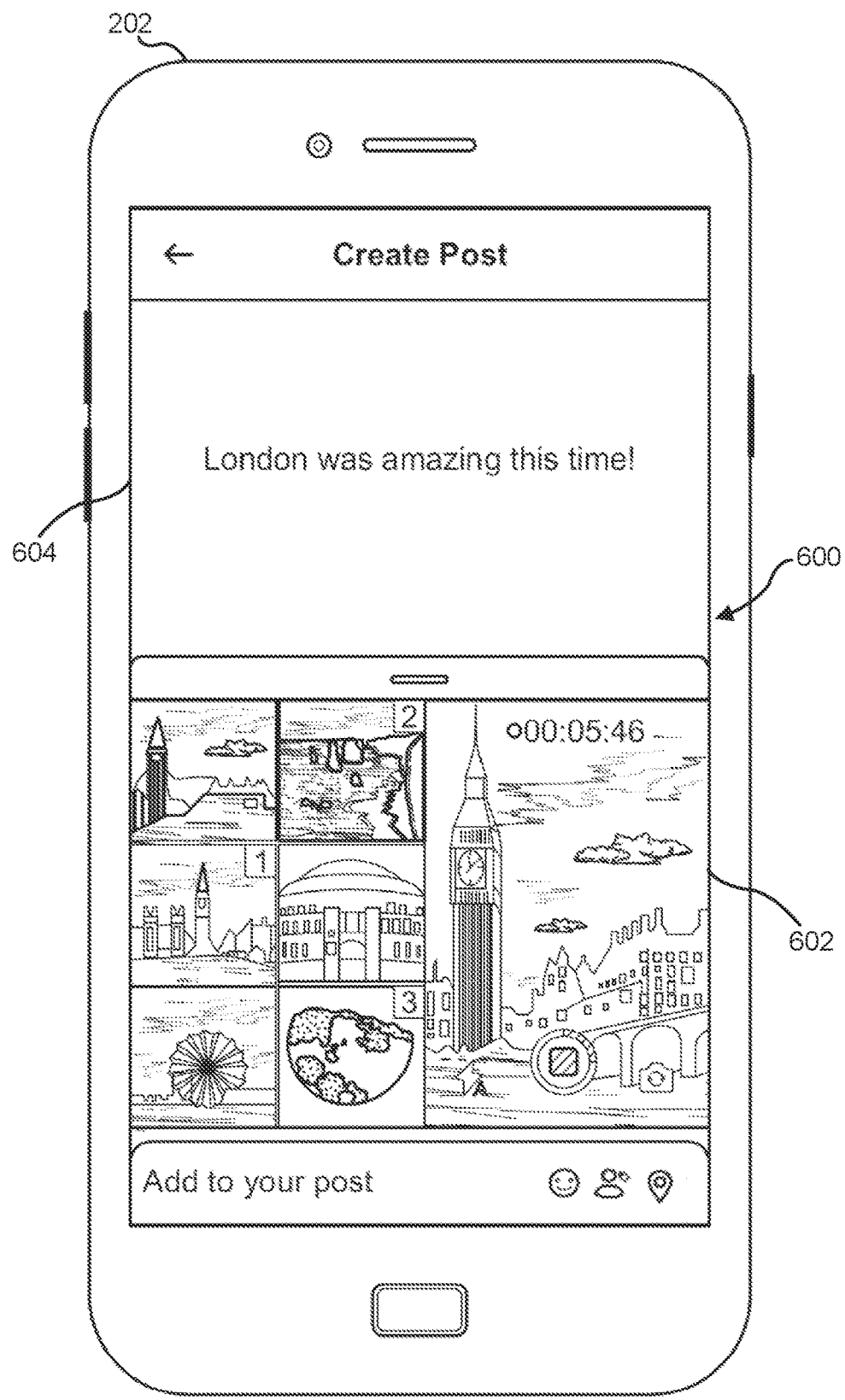
FIG. 6 is an illustration of an exemplary composition screen populated with exemplary user content.

In some embodiments, the input spaces within composition screen 206 may be displayed as a series of vertically arranged layers, as depicted in FIG. 4. As illustrated in FIG. 4, the vertically arranged layers of composition screen 206 may include a text layer 400, a media layer 402, a metadata layer 404, and a posting layer 406. Additionally or alternatively, composition screen 206 may include multiple input spaces arranged in a circular configuration. For example, FIG. 5 illustrates an embodiment of composition screen 206 in which a text layer 500 is followed by a circular layer 502 in which a user avatar is surrounded by a ring of buttons (i.e., a feeling button, a location button, a write button, a camera button, a friends button, and a more button), each corresponding to a different element of a composition that may be digitally manipulated by the user.

Each of the input spaces within composition screen 206 may be presented with a variety of configurations. First, text space 209 may, in one embodiment, include a text box in which a user may submit text with a prompt to input text. For example, as illustrated in text layer 400 in FIG. 4, text space 209 may include the prompt "What's on your mind?" Additionally or alternatively, text space 209 may include a glyph (e.g., a glyph of a pen, a writing pad, and/or a typewriter) that indicates the text space 209 is configured for submitting text.

Next, in some examples, media space 210 may present multiple media items that may be selected via media space 210 for inclusion in a social media composition. Media space 210 may present a variety of types of media items, including, without limitation, digital photographs, digital videos, digital graphics (e.g., Graphics Interchange Format (GIF) files), etc. In some examples, media space 210 may present a group of media items from a media database stored on user device 202 (such as a camera roll). In other examples, media space 210 may present a live camera space from which a live event may be captured and included in a social media composition. In one embodiment, both a live camera space and a group of media items from a media database may be presented in media space 210, as illustrated in media layer 402 in FIG. 4.

Finally, metadata space 212 may, in some examples, include a variety of graphical control elements (e.g., push buttons) that depict different types of metadata that may be added to a social media composition. Using FIG. 4 as a specific example, metadata layer 404 may include a feelings button 408, a friends button 410, and a location button 412.

Returning to FIG. 1, at step 120, one or more of the systems described herein may collect, via the composition interface, user-generated content and metadata information. For example, as illustrated in FIG. 2, composition module 216 may collect user-generated content from text space 209 and/or media space 210 and may collect metadata information from metadata space 212.

Composition module 216 may collect the user-generated content in a variety of ways. For example, in examples in which text space 209 includes a text box in which a user may input text, composition module 216 may collect the text inputted by the user into the text box. In examples in which media space 210 displays media items stored by a media database of user device 202, composition module 216 may collect media items selected by the user from among those displayed. Additionally or alternatively, in examples in which media space 210 displays a live video space, composition module 216 may collect a live video recorded by the user using the live video space. Using FIG. 6 as a specific example, composition module 216 may collect, from a composition screen 600, (1) three digital photographs and a live video from a media space 602 of composition screen 600 and (2) the text "London was amazing this time!" from a text box in a text space 604 of composition screen 600.

In addition to collecting media-based and text-based content generated by the user, composition module 216 may collect user-generated metadata information from a composition interface. In one embodiment, composition module 216 may collect metadata information submitted by the user directly to composition screen 206 (i.e., without requiring the user to toggle to an additional metadata screen). In alternative embodiments, composition screen 206 may include user-selectable elements that, in response to being selected, navigate to an additional metadata screen and composition module 216 may collect the metadata information from the additional screen. Using FIGS. 4 and 7A-7C to provide several specific examples, (1) feelings button 408 illustrated in FIG. 4 may, when selected, navigate to an additional feelings screen 700 illustrated in FIG. 7A, (2) friends button 410 illustrated in FIG. 4 may, when selected, navigate to an additional friends screen 702 illustrated in FIG. 7B, and (3) location button 412 illustrated in FIG. 4 may, when selected, navigate to an additional location screen 704 illustrated in FIG. 7C. In these examples, composition module 216 may collect the metadata information submitted by the user via the additional metadata screens.

In some embodiments, the metadata information collected by composition module 216 may correspond to a metadata item, such as a digital sticker that includes the metadata information. In one such embodiment, composition module 216 may, in addition to collecting a metadata item selected by the user, collect a desired placement for the metadata item. Using FIGS. 4, 7C, and 8 as a specific example, composition module 216 may have received user input selecting digital photograph 414 from media layer 402. In response, composition module 216 may have presented additional location screen 704 depicted in FIG. 7C and received, from additional location screen 704, user input selecting location media item 706, which designates the location "Big Ben London." Then, composition module 216 may present a metadata-placement screen 800 depicted in FIG. 8. Within metadata-placement screen 800, composition module 216 may present a location metadata sticker 802 that includes the location metadata information submitted by the user via additional location screen 704. In this example, metadata-placement screen 800 may allow the user (e.g. using a touchscreen and/or an auxiliary device such as a computer mouse) to drag-and-drop location metadata sticker 802 to a position within metadata-placement screen 800 where the user would like location metadata sticker 802 to be positioned within a social media composition.

In one embodiment, a composition interface may provide a group of metadata items from which a user may select one or more metadata items. In another embodiment, a user may submit and/or select metadata information and composition module 216 may automatically create a metadata item based on the metadata information submitted and/or selected by the user. In some examples, composition module 216 may, in addition to collecting a metadata item selected by the user, receive user input selecting a style for the metadata item (e.g., a color, a font, a size, a background, and/or accompanying glyph). Additionally or alternatively, composition module 216 may receive user input selecting additional information to be included with the metadata item. For example, composition module 216 may receive user input selecting to provide, within a location metadata item, a link to GPS information within a maps application and/or descriptive information describing a location identified by the location metadata item.

Returning to FIG. 1, at step 130, one or more of the systems described herein may, based on the user-generated content and the metadata information, create a social media composition that includes the user-generated content and an interactive metadata item. For example, as illustrated in FIG. 2, a composition module 216 may create social media composition 218 that includes content 220 and an interactive metadata item 222.

Social media composition 218 may represent any type or form of digital user composition configured to be shared via a social media consumption channel that includes user-generated content. In some examples, composition module 216 may create a newsfeed composition. Using FIGS. 4, 7C, and 9 as a specific example, composition module 216 may create a newsfeed composition 900, intended to be consumed by an additional user via an additional user device, that includes a digital photograph 414 collected from media layer 402 in FIG. 4, text (i.e., "London was amazing this time!") selected from text layer 400 in FIG. 4, and location metadata item 706, selected from additional location screen 704 in FIG. 7C.

In additional or alternative examples, composition module 216 may create a stories composition. Using FIGS. 4, 7C, and 10 as a specific example, composition module may create a story with a cover page 1000, which includes the text "London was amazing this time!" collected from text layer 400 in FIG. 4. Cover page 1000 may be configured to automatically transition to a display of digital photograph 414, collected from media layer 402 in FIG. 4, and location metadata item 706, selected from additional location screen 704 in FIG. 7C.

As discussed above, composition module 216 may add one or more interactive metadata items (e.g., interactive metadata item 222) to social media composition 218. Interactive metadata item 222 generally represents any type or form of metadata item with a user-selectable element that changes appearance from an initial appearance to a modified appearance in response to receiving user input selecting the user selectable element. In some examples, interactive metadata item 222 may represent a graphical control element. In these examples, interactive metadata item 222 may include a selectable element that triggers an event (i.e., a change in appearance) when selected. Interactive metadata item 222 may include a variety of different metadata information. For example, interactive metadata item 222 may include, without limitation, location information, time information, weather information, life event information, friends information, opinion information, feelings information, statistical information, descriptive information (e.g., a definition and/or historical information), and/or user-generated text.

The interactive metadata items described herein may be configured to change appearance for users consuming social media compositions, which include the interactive metadata items, from a composition consumption channel (e.g., a newsfeed and/or a stories channel). Thus, the interactive metadata items may enhance the experience of users consuming social media compositions by allowing them to interact with one or more components of the social media compositions.

Interactive metadata item 222 may change appearance in a variety of ways. In some examples, interactive metadata item 222 may alternate between a truncated configuration and an expanded configuration. For example, interactive metadata item 222 may represent a dynamic digital location sticker and changing the appearance of interactive metadata item 222 may include changing the appearance from a truncated version of the dynamic digital location sticker to an expanded version of the dynamic digital location sticker. In this example, the truncated version of the digital location sticker may include a text-based identifier of a location. The expanded version of the digital location sticker may include the text-based identifier and may also include additional content. For example, the expanded version may include a map of the location, a categorization of the location, historical information relating to the location, and/or user ratings pertaining to the location.

Using FIGS. 11A-11B as a specific example, location metadata item 706 may be presented to a user consuming a stories composition channel in a truncated configuration, as shown in FIG. 11A. Then, in response to receiving user input selecting location metadata item 706, location metadata item 706 may inflate to an expanded configuration, as shown in FIG. 11B. As illustrated in FIG. 11B, the expanded version of location metadata item 706 may include a map displaying the location, a number of stars assigned to the location by other users, and a categorization of the location (i.e., a landmark and historical place).

Figures 12A, 12B:
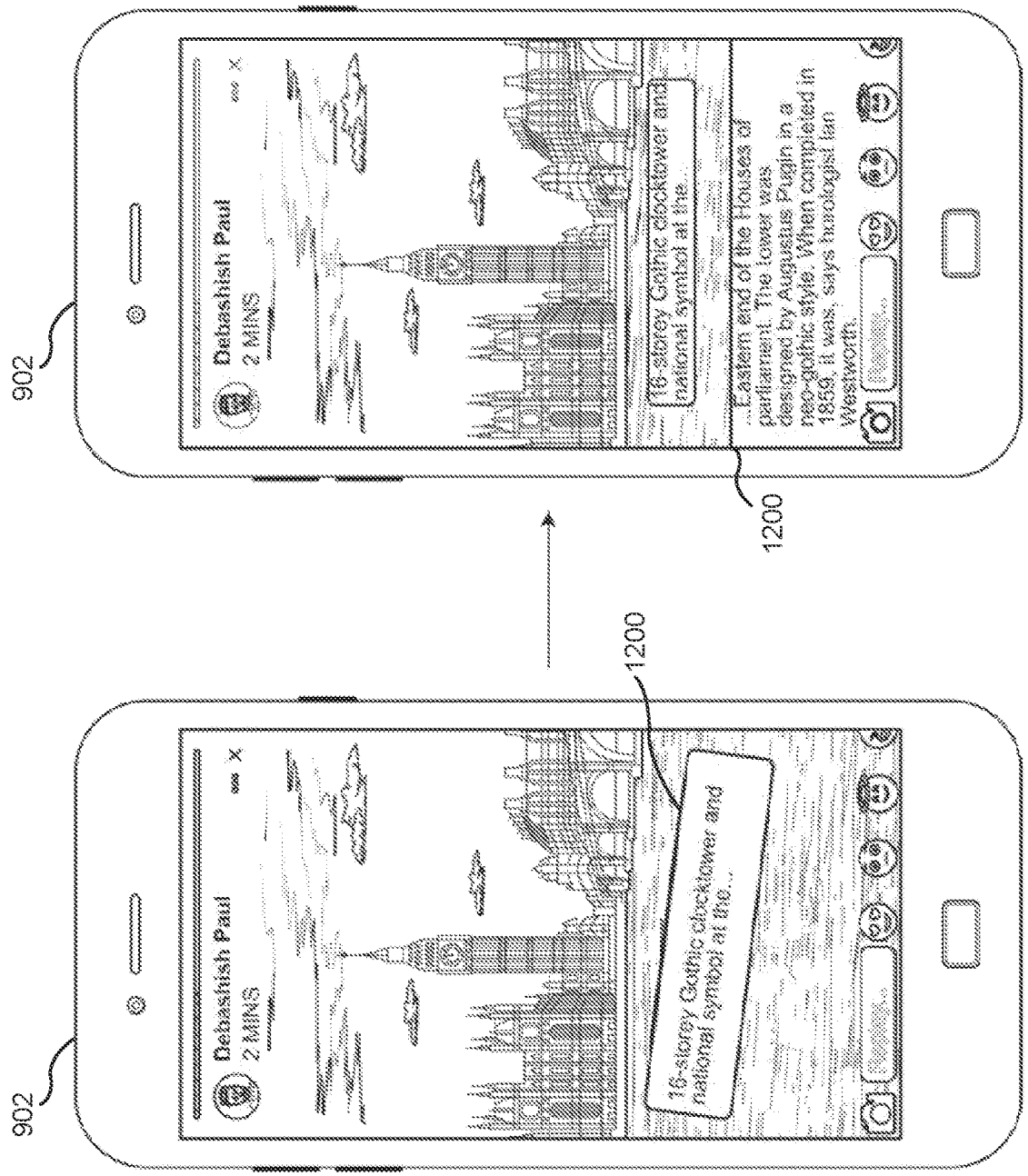
FIGS. 12A-12B are an illustration of the functionality of an exemplary digital text sticker.

As another example, interactive metadata item 222 may represent a dynamic text digital sticker and changing the appearance of interactive metadata item 222 may include changing the appearance from a truncated version of the dynamic text digital sticker, which includes a redacted version of text, to an expanded version of the dynamic text digital sticker, which includes a full version of the text. Using FIGS. 12A-12B as a specific example, a text metadata sticker 1200 may be presented to a user consuming a stories composition channel in a truncated configuration, as shown in FIG. 12A. Then, in response to receiving user input selecting text metadata sticker 1200, text metadata sticker 1200 may inflate to an expanded configuration, as shown in FIG. 12B.

Figures 7A, 7B, 7C:
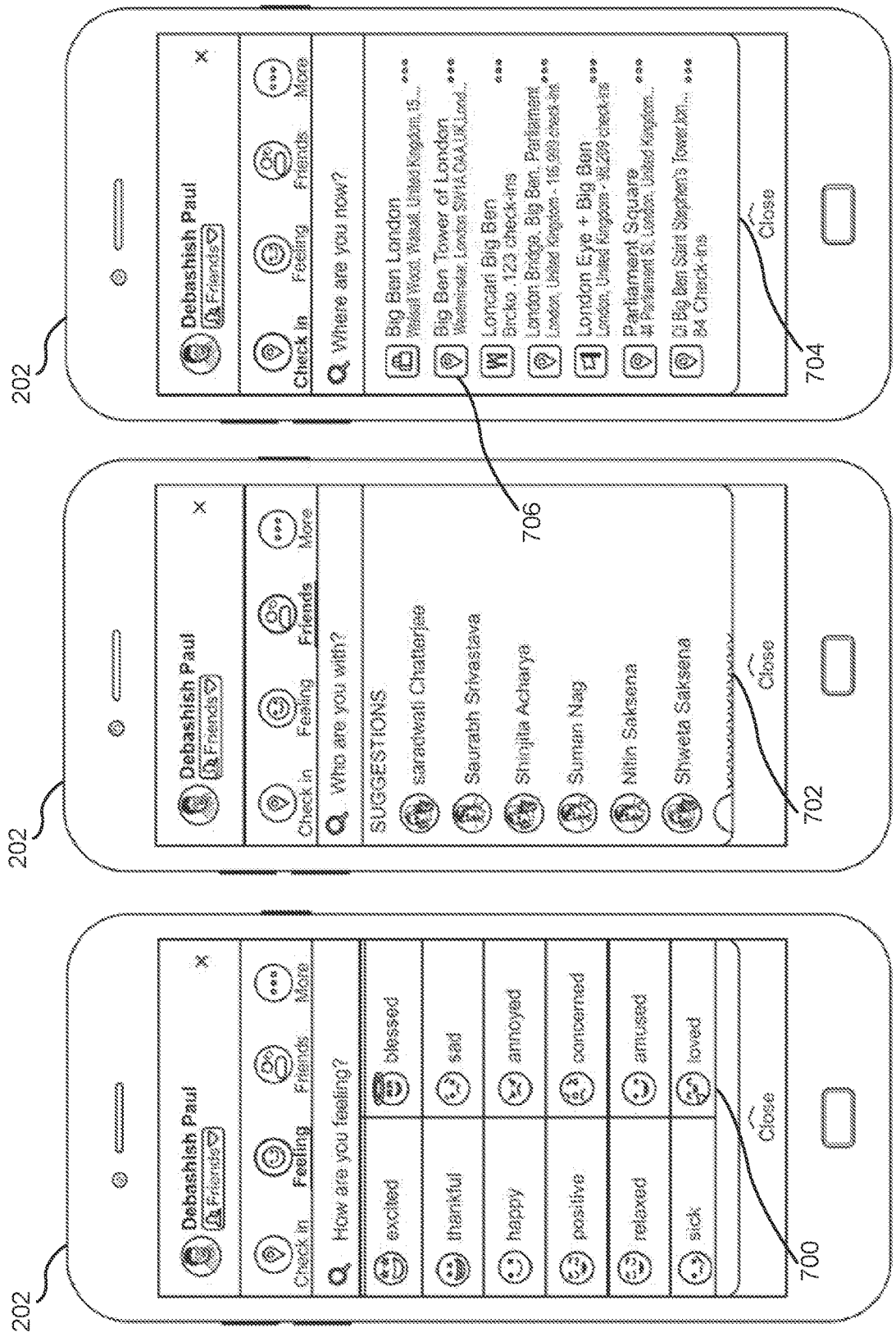
FIG. 7A is an illustration of an exemplary feelings metadata screen.
FIG. 7B is an illustration of an exemplary friends metadata screen.
FIG. 7C is an illustration of an exemplary location metadata screen.
Figure 8:
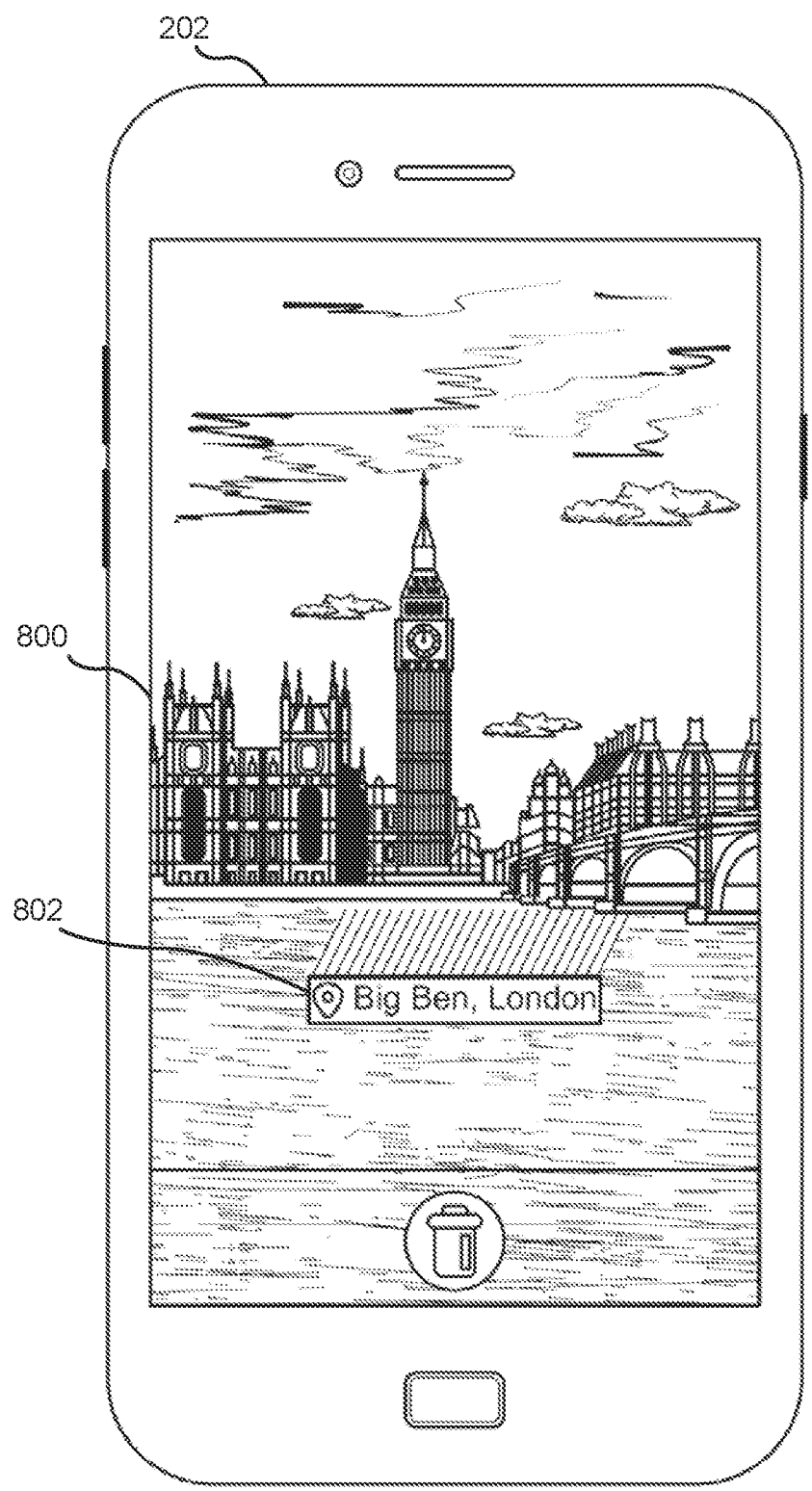
FIG. 8 is an illustration of an exemplary composition screen for placing location metadata.
Figure 9:
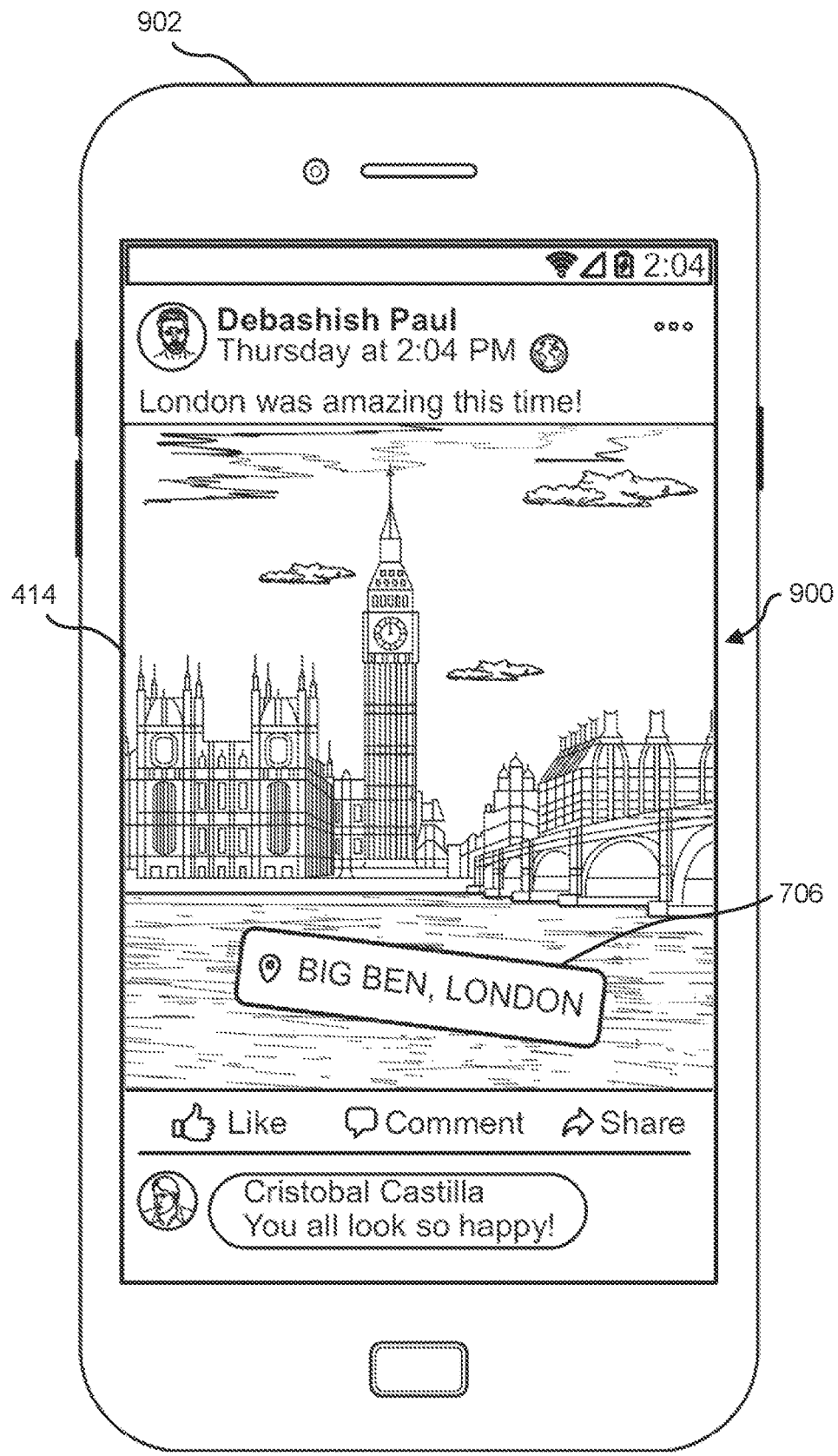
FIG. 9 is an illustration of an exemplary newsfeed composition.
Figure 10B:
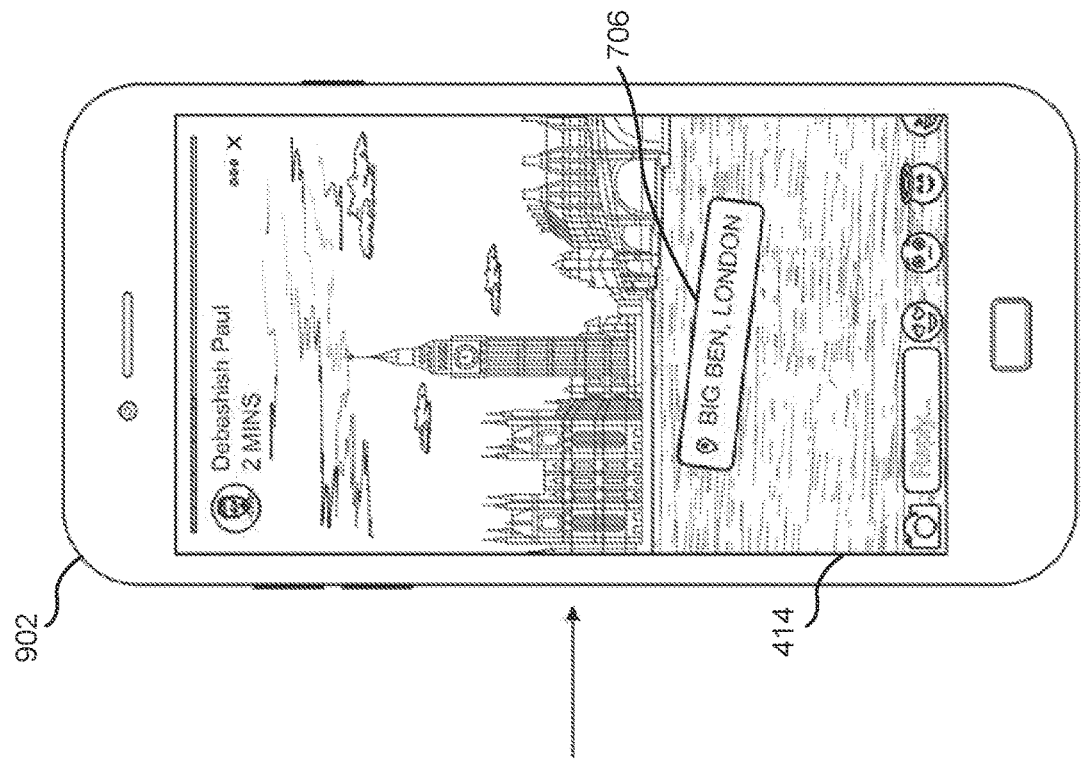
FIGS. 10A-10B are an illustration of an exemplary stories composition.
Figure 10A:
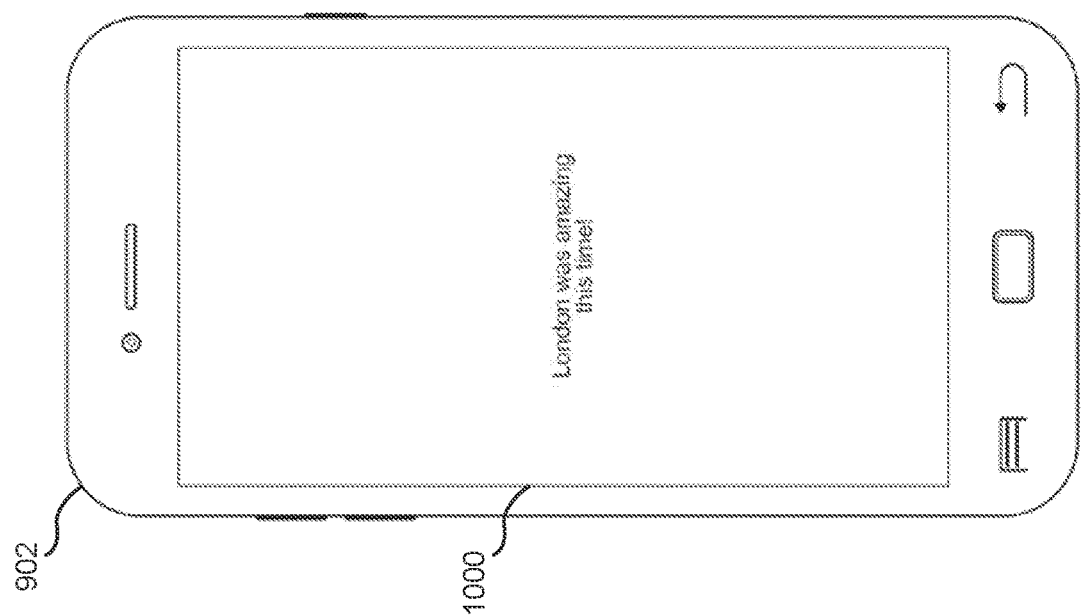

As another example, interactive metadata item 222 may represent a dynamic friends sticker, created based on friends information collected from a friends metadata screen, such as additional friends screen 702 illustrated in FIG. 7B. In this example, changing the appearance of interactive metadata item 222 may include changing the appearance from a truncated version of the dynamic friends sticker, which includes a redacted list of friends tagged in a social media composition and/or an indication of a number of friends tagged in the social media composition, to an expanded version of the dynamic friends sticker that includes a full list of the friends tagged in the social media composition.

In some examples, the expanded version of the dynamic friends sticker may include a list of each friend tagged in a social media composition. In one embodiment, the user consuming the dynamic friends sticker may interact with the expanded version by selecting a push button associated with any one of the listed friends in order to view the friend's profile and/or add the friend to his or her network. Using FIGS. 13A-13B as a specific example, a friends metadata sticker 1300 may be presented to a user consuming a stories composition channel in a truncated configuration, as shown in FIG. 13A. Then, in response to receiving user input selecting friends metadata sticker 1300, friends metadata sticker 1300 may inflate to an expanded configuration, as shown in FIG. 13B.

Figures 14A, 14B:
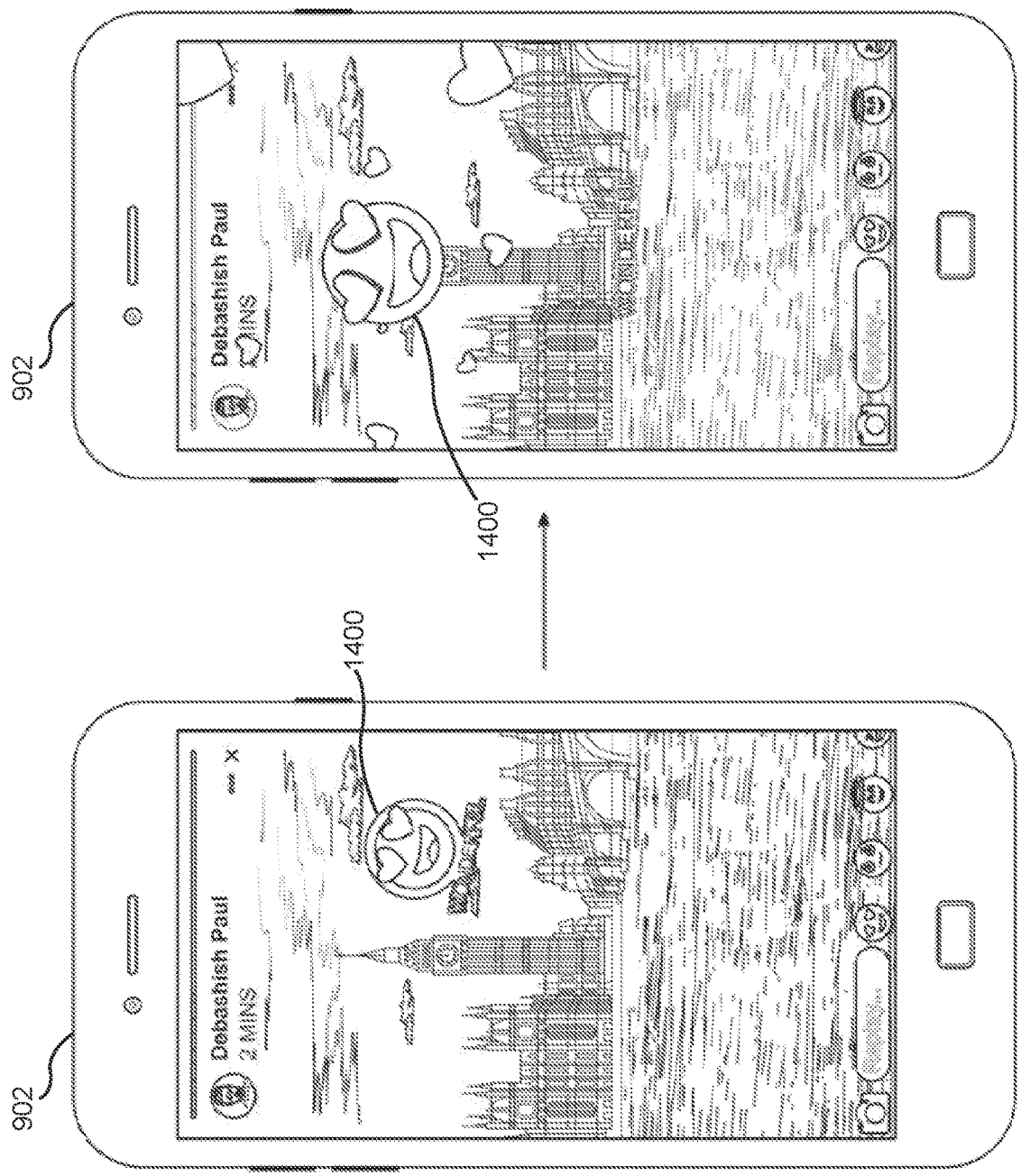
FIGS. 14A-14B are an illustration of the functionality of an exemplary digital feelings sticker.

In some embodiments, interactive metadata item 222 may alternate between a static configuration and an animated configuration. For example, interactive metadata item 222 may represent a feelings sticker and changing the appearance of interactive metadata item 222 may include changing the appearance from a stationary digital image to a digital image with one or more moving elements. Using FIGS. 14A-14B as a specific example, a feelings sticker 1400 in a static configuration may be presented to a user consuming a stories composition channel, as shown in FIG. 14A. As illustrated in FIG. 14A, the static version of feelings sticker 1400 may depict a cartoon of a smiley face with heart eyes and the word "wonderful." Then, in response to receiving user input selecting feelings sticker 1400, the smiley face with heart eyes may move positions and a group of animated hearts may appear and move across the screen.

Returning to FIG. 1, at step 140, one or more of the systems described herein may post the social media composition to a consumption channel of a social-networking platform associated with the social media application. For example, as illustrated in FIG. 2, a consumption module 224 may post social media composition 218 to a consumption channel 226 (e.g., a newsfeed channel and/or a stories channel).

Once consumption module 224 has posted social media composition 218 to consumption channel 226, social media composition 218 may be presented to an additional user via an additional user device. For example, the additional user device may include an additional instance of social media application 208 which may present an instance of consumption channel 226 populated with social media compositions created by contacts of the additional user.

In some examples, the additional user may, upon viewing social media composition 218, interact with interactive metadata item 222 (e.g., by submitting user input that selects a selectable element of interactive metadata item 222). In these examples, a metadata module (operating as part of the additional user device and/or a server associated with the social networking channel) may alter an appearance of interactive metadata item 222, as described above in connection with step 130, in response to receiving the user input.

As described above, the disclosed systems and methods describe interactive digital stickers that convey metadata information for social media compositions. Interactive digital stickers described herein may be manipulated (i.e., interacted with) consumption-side, by users consuming social media compositions via a social media consumption channel such as a newsfeed and/or a stories channel. In some examples, an interactive digital sticker may alternate between a truncated version and an expanded version, in response to receiving user input. In other examples, an interactive digital sticker may alternate between a static version and an animated version. Interactive digital stickers as described herein may convey a variety of metadata information, including, without limitation, friends information, location information, and/or feelings information.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a digital metadata button from an initial configuration to a modified configuration. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving, via a social media application installed on a user device, user input that triggers a composition creation process;
   in response to receiving the user input, providing, via a display element of the user device, a composition landing screen comprising a single interface with a plurality of input spaces comprising a media space, a text space, a metadata space, and a posting space;
   collecting, via the composition landing screen without toggling to any additional screen, a media item submitted via the media space, text submitted via the text space, a metadata item submitted via the metadata space, and user posting input submitted via the posting space; and
   in response to receiving the user posting input, posting a social media composition comprising the media item, the text, and the metadata item on a consumption channel associated with the social media composition, wherein the social media composition is created and posted without requiring the user to navigate from the composition landing screen to any additional screen.

2. The computer-implemented method of claim 1, wherein the user posting input comprises user input requesting to post the social media composition.

3. The computer-implemented method of claim 1, wherein the plurality of input spaces are displayed on the composition landing screen as a plurality of vertically arranged layers.

4. The computer-implemented method of claim 1, wherein:
the media space comprises a display of one or more selectable media items from a media database stored by the user device;
the display of one or more selectable media items comprises at least one of (1) one or more photos or (2) one or more videos; and
the media item submitted via the media space comprises a selectable media item selected from the display of one or more selectable media items.

5. The computer-implemented method of claim 4, wherein the media database comprises a cameral roll.

6. The computer-implemented method of claim 1, wherein:
the media space comprises a live camera space that enables a new media item to be generated; and
the media item submitted via the media space comprises a photo or video captured via the live camera space.

7. The computer-implemented method of claim 1, wherein the plurality of input spaces are simultaneously presented in the initial presentation of the composition landing screen.

8. The computer-implemented method of claim 1, wherein:
the metadata space comprises a display of one or more selectable metadata items; and
the metadata item submitted via the metadata space comprises a selectable metadata item selected from the display of one or more selectable metadata items.

9. The computer-implemented method of claim 1, wherein the metadata item comprises at least one of:
location metadata;
feelings metadata; or
friend metadata.

10. The computer-implemented method of claim 1, wherein the metadata item comprises at least one of:
weather metadata;
time metadata;
a life event; or
a graphic.

11. A system comprising:
a display module, stored in memory of a user device, configured to:
receive, via a social media application installed on the user device, user input that triggers a composition creation process; and
provide, in response to receiving the user input, a composition landing screen comprising a single interface with a plurality of input spaces comprising a media space, a text space, a metadata space, and a posting space;
a composition module, stored in the memory of the user device, configured to:
collect, via the composition landing screen without toggling to any additional screen, a media item submitted via the media space, text submitted via the text space, a metadata item submitted via the metadata space, and user posting input submitted via the posting space; and
in response to receiving the user posting input, post a social media composition comprising the media item, the text, and the metadata item on a consumption channel associated with the social media composition, wherein the social media composition is created and posted without requiring the user to navigate from the composition landing screen to any additional screen; and
at least one physical processor configured to execute the display module and the composition module.

12. The system of claim 11, wherein the user posting input comprises user input requesting to post the social media composition.

13. The system of claim 11, wherein the plurality of input spaces are displayed on the composition landing screen as a plurality of vertically arranged layers.

14. The system of claim 11, wherein:
the media space comprises a display of one or more selectable media items from a media database stored by the user device; and
the display of one or more selectable media items comprises at least one of (1) one or more photos or (2) one or more videos; and
the media item submitted via the media space comprises a selectable media item selected from the display of one or more selectable media items.

15. The system of claim 14, wherein the media database comprises a camera roll.

16. The system of claim 11, wherein:
the media space comprises a live camera space that enables a new media item to be generated; and
the media item submitted via the media space comprises a photo or video captured via the live camera space.

17. The system of claim 11, wherein the plurality of input spaces are simultaneously presented in the initial presentation of the composition landing screen.

18. The system of claim 17, wherein:
the metadata space comprises a display of one or more selectable metadata items; and
the metadata item submitted via the metadata space comprises a selectable metadata item selected from the display of one or more selectable metadata items.

19. A non-transitory computer-readable medium comprising one or more computer-executable instructions that, when executed by at least one processor of a computing device, cause the computing device to:
receive, via a social media application installed on a user device, user input that triggers a composition creation process;
in response to receiving the user input, provide, via a display element of the user device, a composition landing screen comprising a single interface with a plurality of input spaces comprising a media space, a text space, a metadata space, and a posting space;
collect, via the composition landing screen without toggling to any additional screen, a media item submitted via the media space, text submitted via the text space, a metadata item submitted via the metadata space, and user posting input submitted via the posting space; and
in response to receiving the user posting input, post a social media composition comprising the media item, the text, and the metadata item, on a consumption channel associated with the social media composition, wherein the social media composition is created and posted without requiring the user to navigate from the composition landing screen to any additional screen.

20. The non-transitory computer-readable medium of claim 19, wherein the plurality of input spaces are displayed on the composition landing screen as a plurality of vertically arranged layers.

* * * * *